Nov. 1, 1960   D. F. GARMAN   2,958,109
MOLDING FASTENER

Filed March 13, 1958   3 Sheets-Sheet 1

INVENTOR.
DONALD F. GARMAN
BY
ATTORNEY

Nov. 1, 1960  D. F. GARMAN  2,958,109
MOLDING FASTENER

Filed March 13, 1958  3 Sheets-Sheet 2

INVENTOR.
DONALD F. GARMAN
BY
*Malcolm W. Fraser*
ATTORNEY

Nov. 1, 1960 D. F. GARMAN 2,958,109
MOLDING FASTENER

Filed March 13, 1958 3 Sheets-Sheet 3

INVENTOR.
DONALD F. GARMAN
BY
Malcolm W. Fraser
ATTORNEY

United States Patent Office 2,958,109
Patented Nov. 1, 1960

2,958,109

MOLDING FASTENER

Donald F. Garman, Toledo, Ohio, assignor to Prestole Corporation, Toledo, Ohio, a corporation of Michigan Filed Mar. 13, 1958, Ser. No. 721,297

1 Claim. (Cl. 24—73)

This invention relates to sheet metal fasteners for mounting on an apertured supporting panel.

An object is to produce a fastener of this character for attaching moldings to supporting panels and leaving the unique feature of being adjustable one way or another to enable, as an example, one strip of molding to be aligned with another in a simple and expeditious manner without interfering with intimate and snug engagement between the fastening device and supporting panel.

Another object is to improve the attaching and securing means by which the sheet metal fastener body is secured in the supporting panel aperture, thereby to effect simple and effective means for quickly and securely establishing the desired connection.

A further object is to produce new and improved means by which two or more panels can be secured together by a unique fastener passing through registering apertures in the panels.

A still further object is to produce novel attaching means by which fasteners, such as molding fasteners, cable clips and the like, can be connected to an apertured supporting panel.

Other objects and advantages of the invention will hereinafter appear and for purposes of illustration but not of limitation, embodiments of the invention are shown on the accompanying drawings in which.

The illustrated embodiment of the invention shown on Figures 1 to 4 comprises a supporting panel 10 of sheet metal which may be the body portion of an automobile, a refrigerator, a stove or the like and is adapted to receive a molding strip 11 which is longitudinally elongate. The molding 11 is for ornamental purposes and is formed with a transversely arched body portion and inwardly curved longitudinally extending side edge portions 12.

Figure 1:
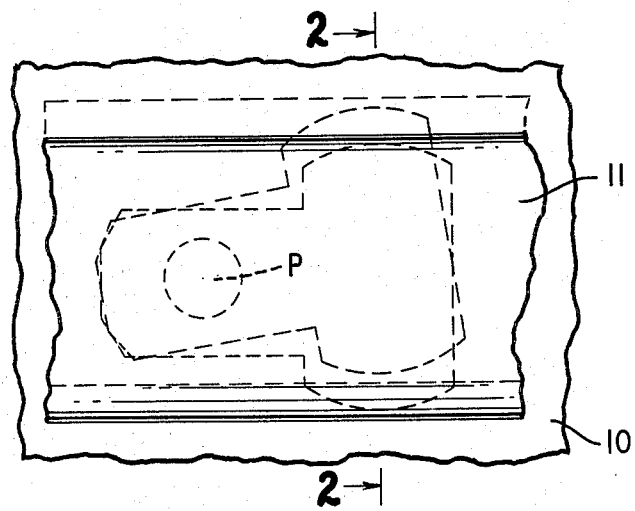
Figure 1 is a fragmentary plan view of a supporting panel showing a fragment of a molding which is retained in place by a fastener which is shown by broken lines and indicating the adjustability of the molding relative to the supporting panel made possible by this fastener.
Figure 2:
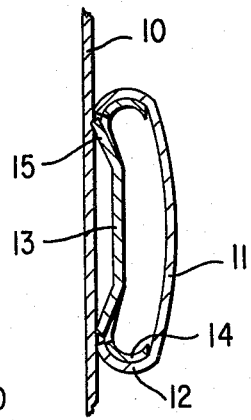
Figure 2 is a transverse sectional view substantially on the line 2—2 of Figure 1.
Figure 3:
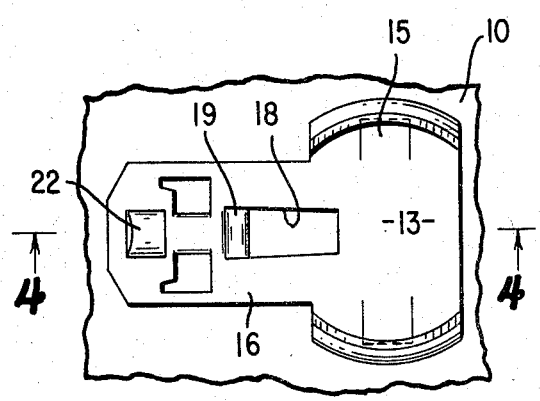
Figure 3 is a view similar to Figure 1 with the molding strip removed.
Figure 4:
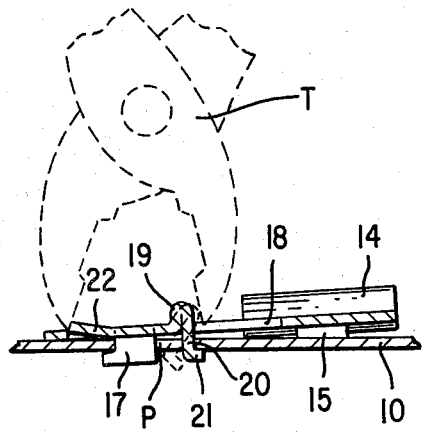
Figure 4 is a longitudinal sectional view substantially on the line 4—4 of Figure 3 and showing the manner in which the attaching means is actuated into panel securing position.

In accordance with this invention a sheet metal fastener is provided for attaching the molding strip 11 to the body portion and in this instance the fastener is provided with a flat sheet metal body portion 13 which is formed with upwardly and inwardly curved opposite side edge portions 14 which are rounded as indicated on Figure 3, the center of the body portion being the axis and the curvature being in the nature of arcs struck from such an axis. Struck downwardly from the body portion 13 centrally of each of the curved edge portions 14 is a tongue 15 which serve as stops to limit the movement of the edge portions of the molding strip 11.

The body portion 13 is provided with a lateral extending coplanar integral portion or extension 16. The end portion of the extension is secured to the supporting panel 10 in such manner that the flat body portion 13 can be rocked upwardly or downwardly about the end portion as an axis thereby to enable the molding strip 11 to be moved or adjusted upwardly or downwardly, as indicated by the broken lines on Figure 1. This enables the molding strip to be adjusted within limits so that it can be longitudinally aligned with other molding strips. Thus in the event of error in the mounting of the molding strips on the supporting body, they can be adjusted readily and conveniently with other molding strips without difficulty and without the necessity of providing other apertures in the supporting panel.

In this instance formed in the end portion of the extension 16 is a pair of hook members 17. These hook members are struck from the body of the extension as indicated by the holes in Figure 3 which are generally rectangular in shape with a lateral extension at one end. The hook members are bent downwardly at right angles with respect to the extension to a position shown in Figure 4 with the toe or hook portion extending to the left of the figure so as to engage beneath the supporting panel 10. As shown, the hook portions 17 are hooked into a round panel aperture P, and the hook portions 17 are spaced laterally from each other a distance approaching the diameter of the aperture. Thus a pair of hook members 17 engage against an edge portion of the panel aperture P with the hook ends projecting beneath the supporting panel 10.

Arranged opposite to the hook members 17 for engaging against an opposite edge portion of the panel aperture P is a member which in this instance is in the form of an elongate tapered strip struck from the extension 16, as indicated by the opening 18 on Figure 3. As shown, this portion of the metal near the end which is integral with the extension 16 is folded upon itself to provide an upstanding lug portion 19. Integral with the free end portion of this lug is a depending extension or finger 20 which is disposed substantially at right angles to the plane of the extension 16. The finger 20 terminates at its free end in an outwardly extending hook 21, the metal being bent at substantially right angles to the body of the finger as indicated.

Thus as indicated, the finger 20 which is normally bent rearwardly or in a direction toward the hook members 17 so that the hook members can be engaged in the panel aperture P and thereafter the finger 20 is bent or flexed to the left so that the hook 21 is moved to the right to engage beneath the body panel 10 at the edge of the aperture P. To accomplish this purpose a lug 22 is pressed from the extension 16 adjacent the free end of the extension as indicated in Figure 3. This lug is slightly bent upwardly above the plane of the extension so that pliers T can be employed, one jaw of which engages the lug 22 and the other engages the lug 19. By forcing the jaws of the pliers together, the finger 20 is flexed to the right of Figure 4 to position the hook 21 beneath the body panel 10, thereby securely to anchor the fastener in the panel aperture P but enable rotative movements of the fastener relative to the panel aperture P.

With the fastener thus connected to the body panel 10, it will be understood that although the frictional contact with the edge of the panel aperture is such as to normally hold the fastener in the position of adjustment, nevertheless by an upward or downward pressure imparted to the molding strip 11, the fastener can be rocked upwardly or downwardly, thereby to adjust the position of the molding strip along the body panel 10. In the desired position, the panel will be retained in place due to the frictional engagement between the flanges of the molding strip and the fastener as well as between the hook members 17 and finger 20 and the edge of the panel aperture P.

Figure 5:
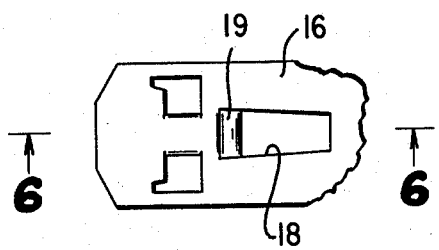
Figure 5 is a fragmentary plan view of the extension of the molding fastener and showing an alternate means by which the fastener is attached to the supporting panel.
Figure 6:
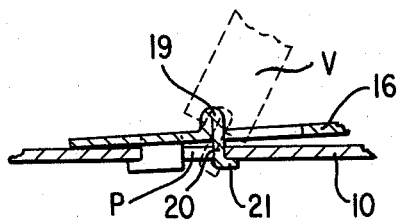
Figure 6 is a longitudinal sectional view on the line 6—6 of Figure 5 and showing the tool employed for flexing the hook to its panel engaging position.

Referring to Figures 5 and 6, a structure very similar to that above described is shown except the lug 22 is eliminated. This requires the use of a different form of tool for flexing the finger 20 to its engaged position. As shown, an operating tool V is employed which has at its outer end a notch of such size as will fit snugly over the lug 19 and properly engage the opposite sides therof. A rocking motion of the tool V will be adequate to flex the finger 20 to or away from its engaged position to dispose the hook 21 beneath the suporting or body panel 10 or away therefrom as will be readily understood.

Figure 7:
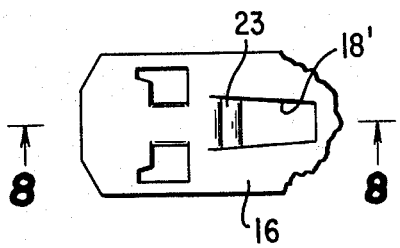
Figure 7 is a fragmentary view showing an extension of the fastener similar to that of Figure 5 and showing a still further form of means for attaching the fastener to the supporting panel.
Figure 8:
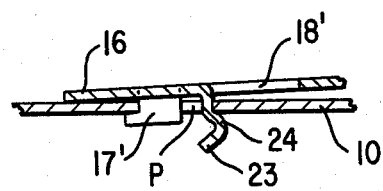
Figure 8 is a longitudinal sectional view on the line 8—8 of Figure 7 and showing the snap fastener means for engaging the underside of the supporting panel for cooperating in securing the fastener to the supporting panel.

Referring to Figures 7 and 8, an alternate form of connection between the fastener and the supporting panel is shown. This is similar to the form above described in that the hook members 17' are as above described. However in this form, instead of the finger 20, a depending finger 23 is struck from the extension 16 providing an opening 18', similar to the opening 18 as above described. The finger 23 is bent at substantially right angles to the extension 16 but as shown is formed at its lower end with an outwardly and inwardly bent portion providing a cam surface 24 so that when the finger is forced into the panel aperture P, the cam will cause the finger to flex sufficiently to pass the edge of the aperture and then abruptly snap into engaging position to the form shown in Figure 8, thereby securely holding the fastener in position but enabling the rocking adjustment of the fastener as above described.

Figure 9:
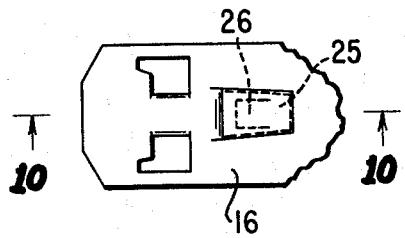
Figure 9 is a fragmentary plan view of an extension showing a still further form of attaching means.
Figure 10:
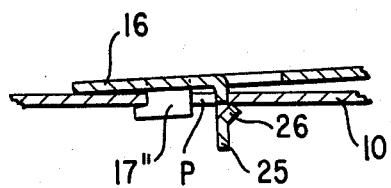
Figure 10 is a longitudinal sectional view on the line 10—10 of Figure 9 and showing the fastening means involving a depending finger having a struck out tongue to engage the underside of the supporting panel and cooperate with a hook member for securing the fastener in position of use but still permitting the rocking of the fastener to enable molding adjustments.

A further form of connection is shown in Figures 9 and 10 and this form is similar to the forms above described in that similar hook members 17" are as above described. However in this form a straight depending finger 25 is struck from the extension 16, the opening being of a similar tapered form as shown in Figure 9. The finger 25 is disposed at substantially right angles to the extension 16 and struck from the lower portion of the finger is a tongue 26 which extends outwardly sufficiently so that when the finger is forced through the aperture, the tongue will cause flexure of the finger sufficient to pass through the aperture and then to snap out into the position shown in Figure 10 in which the tongue is disposed beneath the supporting panel 10 and thereby cooperates with the hook members 17" securely to retain the fastener in the engaged position.

Figure 11:
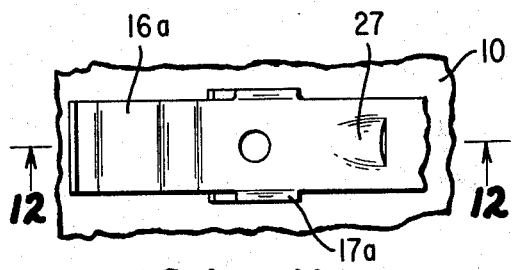
Figure 11 is a fragmentary plan view of an extension arm of a fastener showing a further attaching means embodying a pair of hook members and a pressed-out stop element.
Figure 12:
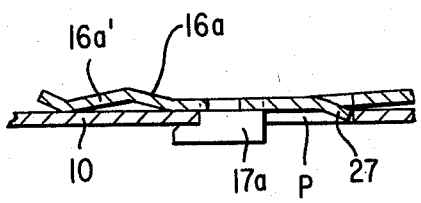
Figure 12 is a longitudinal sectional view on the line 12—12 of Figure 11.

The alternate form shown on Figures 11 and 12 comprises a similar extension 16a which adjacent the free end thereof is formed with an arch portion 16a' which creates a spring tension as will be readily understood. Spaced inwardly from the arch portion is a pair of hook members 17a similar to those above described except in this instance the hook members are formed by folding edge portions of the sheet metal extension downwardly at right angles thereto. These hook members are on opposite sides of the extension and hook into the panel aperture P similar to the hook members above described. After the hook members 17a have engaged one side of the panel aperture P, a pressed out lug 27 can be pushed downwardly into abutting engagement with the opposite edge of the panel aperture P. As shown, the lug 27 is pressed out and downwardly from the extension 16a, a portion of the metal being sheared and then pressed down into a lug form.

Figure 13:
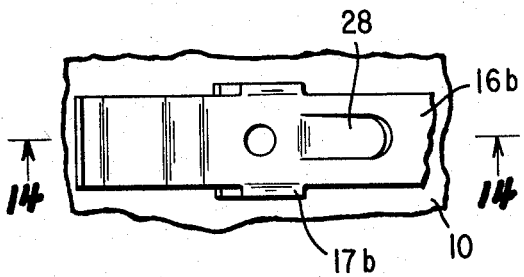
Figure 13 is a fragmentary plan view of a fastener showing a still further attaching means somewhat resembling that shown in Figures 11 and 12 but embodying a struck-out flexible tongue for engagement with one edge portion of the attaching panel aperture.
Figure 14:
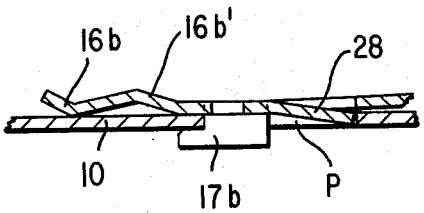
Figure 14 is a longitudinal sectional view on the line 14—14 of Figure 13.

A still further form is shown on Figures 13 and 14 in which the extension 16b is similarly provided with an upwardly extending arch 16b' to afford spring action on the free end portion of the extension. In this instance the hook members 17b on opposite sides of the extension are similar to those described in connection with Figures 11 and 12. The hook members 17b engage one side of the panel aperture P and the opposite edge of the panel aperture is engaged by a downwardly extending struck out finger 28. This is formed by forming parallel cuts or slits in the metal and a curved free end slit and thereupon the finger is bent downwardly as indicated in Figure 14. Thus after the hook members 17b have been forced into position to engage the edge portion of the panel aperture P and to engage the underside of the supporting panel 10, then the flexible finger 28 will be in positon to snap downwardly to engage the opposite edge portion of the panel aperture.

Although the various forms of panel mountings above described are admirably adapted for use in connection with the adjustable molding fastener hereinbefore described, they can be used to advantage with other forms of fastening devices. For example, instead of a molding fastener, these mountings can be used with and form a part of a cable clip. Additionally it will be understood that these mountings may be employed as connecting fasteners to enable a panel or flat piece of sheet metal to be connected to a supporting panel, there being registering apertures in these panels so that the fastening elements can extend therethrough and thereby effect a secure connection between these parts, as will be readily understood by those skilled in this art.

Numerous changes in details of construction, arrangement and choice of materials may be effected without departing from the spirit of the invention, especially as defined in the appended claim.

What I claim is:

A molding fastener comprising a unitary device having a sheet metal body, a pair of molding flange engaging members, the molding engaging portions of said members being curved with the center of the body the axis of such curvature, a lateral extension on said body and in substantially the same plane, and means for anchoring the free end portion of said extension in a round hole of a supporting panel, said means including multi-tongue-like elements integral with and depending from said extension to engage the marginal edge portions of the round hole of the supporting panel, thereby to position the extension and the flange engaging members on the same side of the supporting panel and to enable adpjustment of the molding by rocking the body about said anchoring means as an axis.

References Cited in the file of this patent

UNITED STATES PATENTS

| | | |
|---|---|---|
| 2,460,722 | Warra | Feb. 1, 1949 |
| 2,681,487 | Poupitch | June 22, 1954 |
| 2,783,514 | Franz | Mar. 5, 1957 |
| 2,852,829 | Holton | Sept. 23, 1958 |

FOREIGN PATENTS

| | | |
|---|---|---|
| 537,644 | Great Britain | June 30, 1941 |
| 783,206 | Great Britain | Sept. 18, 1957 |